United States Patent [19]

Mein et al.

[11] 4,290,923

[45] Sep. 22, 1981

[54] RARE-EARTH-MANGANESE OXIDATION CATALYSTS AND PROCESS OF PRODUCING SAME

[75] Inventors: Peter G. Mein; Arno H. Reidies, both of La Salle, Ill.

[73] Assignee: Carus Corporation, LaSalle, Ill.

[21] Appl. No.: 118,553

[22] Filed: Feb. 4, 1980

Related U.S. Application Data

[63] Continuation-in-part of Ser. No. 8,591, Feb. 1, 1979, abandoned.

[51] Int. Cl.$^3$ .......................... B01J 23/10; B01J 23/34
[52] U.S. Cl. ...................................... 252/462; 423/245
[58] Field of Search ............................... 252/462, 471; 423/245 R, 245 S, 599

[56] References Cited

U.S. PATENT DOCUMENTS

| | | | |
|---|---|---|---|
| 1,345,323 | 6/1920 | Frazer et al. | 252/471 |
| 2,433,932 | 1/1948 | Stosick | 252/462 X |
| 3,700,605 | 10/1972 | Dodman et al. | 252/471 |
| 3,838,069 | 9/1974 | Miyazaki et al. | 252/462 X |
| 3,865,752 | 2/1975 | Remeika et al. | 252/462 |

Primary Examiner—W. J. Shine

[57] ABSTRACT

Alkali metal delta manganese dioxide hydrate, which is obtained as a by-product in the industrial oxidation of organics by $KMnO_4$ is subjected to ion exchange reaction with rare earth ions of the ceria subgroup (viz. cerium, lanthanum, etc.). By employing favorable temperature and pH conditions, a reaction product can be produced containing as little as 0.03 moles of alkali metal per mole of manganese, and up to one mole of ceria rare earth per six moles of manganese. The separated product is prepared for catalytic use in the form of dried porous pellets. The resulting oxidation catalyst has high efficiency, long life, and optimum activity at reasonable temperatures. The catalyst can be used advantageously for applications such as the oxidation and deodorization of exhaust gases from paint drying ovens.

24 Claims, No Drawings

RARE-EARTH-MANGANESE OXIDATION CATALYSTS AND PROCESS OF PRODUCING SAME

CROSS-REFERENCE

This application is a continuation in part of copending application Ser. No. 8,591, filed Feb. 1, 1979, now abandoned.

BACKGROUND AND PRIOR ART

Oxidation catalysts containing manganese and a polyvalent metal, such as copper, cobalt, or silver, have been in commercial use for many years. They are referred to as "Hopcalites". The Hopcalite catalyst containing copper with manganese has been commonly used in gas masks for oxidation of carbon monoxide. Hopcalites may be formed by the coprecipitation of $MnO_2$ with $Cu(OH)_2$ or other polyvalent metal hydroxide. (See, for example, U.S. Pat. No. 1,345,323 of 1920.) Manganese catalysts containing copper or other polyvalent metal have also been prepared from a solution of the metal salt and potassium permanganate in the presence of hydrogen peroxide. (U.S. Pat. No. 1,971,168 (1934), and U.S. Pat. No. 1,995,353 (1935).) The resulting catalyst is an acid manganate of the copper or other polyvalent metal, such as, for example, $Cu(HMnO_3)_2$. As far as is known, such acid manganate catalysts have not found commercial applications.

Dodman et al in U.S. Pat. No. 3,700,605 (1972) describe a procedure for preparing a manganese catalyst by first forming a manganese oxide precipitate from potassium permanganate in the presence of alkali metal hydroxide. The recovered precipitate is resuspended in water, and an aqueous solution of a salt of a polyvalent metal is introduced into the suspension to react therewith. The patent recommends the use of cobalt, copper, silver or lead ions to replace the alkali metal in the precipitate. This ion exchange reaction is described as being carried out at ambient temperature (e.g. 20° C.). No pH adjustment is disclosed. Dodman et al propose that an inert insoluble substance (e.g. kieselguhr or silica) should be suspended in the potassium permanganate solution as it is converted to the manganese dioxide precipitate, thereby providing a catalyst support.

Dodman et al did not propose the use of "by-product" manganese dioxide as a starting material for catalyst preparation. However, the by-product manganese dioxide resulting from the use of potassium permanganate to oxidize organic substances under alkaline conditions is chemically similar to the manganese dioxide precipitate prepared by Dodman et al. Chemically, they are both alkali metal delta manganese dioxide hydrate. During the course of the experimental work leading to the present invention, it was found that aqueous solutions of cobalt or copper nitrate could be reacted with by-product manganese dioxide under the conditions described by Dodman et al and that the resulting products had catalytic activity for hydrocarbon oxidation. However, for certain applications (viz. paint drying ovens) the cobalt or copper catalysts are not as efficient and do not have as long catalyst life as desirable.

When an attempt was made to react a solution of cerium nitrate with by-product manganese dioxide under the conditions described by Dodman et al, the resulting product still contained an appreciable amount of alkali metal and was not suitable for use as an oxidation catalyst. Further discoveries lead to the development of a process for producing rare earth-manganese oxidation catalysts of superior properties. This catalyst and its method of production are the subject matter of this application.

The present invention provides a means for converting by-product manganese dioxide (which presently has little or no commercial use) to a highly desirable oxidation catalyst. For example, the resulting rare earth-manganese catalysts perform efficiently for the oxidation and deodorization of exhaust gases from paint drying ovens, such as those used in the automobile industry. The catalysts of this invention are therefore believed to be of great value in connection with air pollution control, and to have a wide field of application for oxidation of organic materials in industrial waste gases before they are discharged to the atmosphere.

DESCRIPTION OF INVENTION

The starting material for practicing the present invention can be generically described as alkali metal delta manganese dioxide hydrate. The alkali metal content of the manganese dioxide may be potassium, sodium, or other alkali metal, but will usually comprise both sodium and potassium. When the manganese dioxide is produced by the oxidation of an organic substance under conditions where the alkalinity is provided by sodium hydroxide, the resulting manganese dioxide will contain both sodium and potassium. Such by-product $MnO_2$ may contain from 0.55 to 0.65 moles of total alkali metal per mole of Mn, about 0.5 moles of which are bound alkali which cannot be washed out with water. A representative analysis of such by-product $MnO_2$ is: 47.5% $MnO_2$, 2.8% $K_2O$, 8.6% $Na_2O$, 41% $H_2O$ (the sodium and potassium being expressed as oxides).

Although the use of by-product $MnO_2$ is preferred, if desired, potassium permanganate ($KMnO_4$) can be converted into alkali metal delta manganese dioxide. If other alkali metal ions (viz. lithium ions) are present during the reduction of the potassium permanganate to manganese dioxide, the resulting product will also contain them.

By-product manganese dioxide is a fine particulate solid, the particles having an average size of approximately 20 microns in diameter. These particles can readily be suspended in an aqueous reaction solution, and maintained in suspension by low energy mixing. For the purpose of the present invention, it is therefore convenient to suspend the manganese dioxide in an aqueous solution containing the rare earth ions to be reacted with the manganese dioxide for replacement of the alkali metal by an ion exchange-type reaction. However, alkali metal delta manganese dioxide hydrate is strongly alkaline, giving a pH in the range of 11-14 when suspended in water. It has been found that alkaline pH conditions are undesirable for the replacement reaction. At alkaline pH's the reaction cannot be carried to completion. Further, it is desirable to avoid the formation of hydroxide precipitates of the rare earth, and these can form at low alkaline pH's.

To produce the rare earth manganese oxidation catalyst of the present invention, it is important to exercise pH control, and to substantially avoid alkaline conditions during the reaction period. Preferably, the manganese oxide is added to a solution of the rare earth ions in such a manner as to prevent the pH of the resulting suspension from becoming alkaline. Even though the salts of the rare earths, such as the nitrate salts, form acid solutions in water, it will usually be necessary to add acid to prevent the alkaline manganese dioxide from causing the suspension pH to rise above 7.0. In general, it is desirable to employ a starting pH for the suspension of from 5.0 to 7.0, such as a pH of about 5.5 to 6.5. If the starting pH is too strongly acid, such as pH's substantially below 5.0, the hydrogen ion will compete with the rare earth ions for the replacement, and the resulting product will be less desirable for use as an oxidation catalyst. The pH control by acid addition preferably uses the same acid as the rare earth salt anion (nitric acid for nitric salts, etc.), thereby avoiding introducing other anions, but other acids can be used.

For promoting the reaction, it is also desirable to apply heat to the reacting solution. It has been found that the reaction proceeds very slowly at ordinary room temperature. For example, replacement of the alkali by cerium ion using a reaction temperature of 25° C. was found to take from 210 to 220 hours to approach completion. However, when the reaction solution is heated at a temperature of 35° C., only 20 to 30 hours is required for completion of the reaction, the alkali metal being replaced by the rare earth metals. In general, therefore, it is desired to employ a reaction temperature of at least 30° C. Higher temperatures can be employed up to at least 75° C., with a further reduction in reaction time.

It is also desirable to use sufficient solution so that the particles of manganese dioxide are easily maintained in suspension. For example, from 2.5 to 3.5 parts of the solution can be used per part by weight of the by-product $MnO_2$. The reacting solution preferably should contain an excess of the rare earth metal ions over that required for complete replacement of the alkali metal. For example, on a molar basis, the reacting solution may contain from 0.2 to 0.35 moles of rare earth ion per mole of manganese metal. The concentration of the ions in the reacting solution is not critical, but, in general, it will be desirable to avoid very dilute solutions or saturated solutions.

The rare earths to be used preferably belong to the ceria subgroup of rare earths. This group includes cerium, lanthanum, neodymium, praseodymium, and samarium. For preparing the catalyst from individual rare earths, cerium or lanthanum are preferred. However, desirable results can be obtained by using mixtures of ceria group rare earths, such as those containing principally cerium, lanthanum, and neodymium. The rare earths are used in the form of their soluble salts. For example, nitrate salts give excellent results. Other soluble salts may be used. It is desirable to avoid salt anions which may adversely affect the catalysts. For example, the presence of chloride ions is believed to be less desirable for this reason. From the standpoint of the desired reaction, the only requirement is that the solution contain the rare earth ions. Other rare earths, such as yttrium or others of the yttria subgroup, can also be used in the process of this invention, but, in general, are not as desirable as the rare earths of the ceria subgroup.

For the purpose of the present invention, the exchange reaction should be continued until the reaction product contains not over 0.05 moles of bound alkali metal per mole of manganese. The term "bound" alkali metal refers to the alkali metal remaining after the reaction product has been thoroughly washed with water. Such washing will remove the free alkali metal ions liberated by the reaction. For optimized catalytic activity, it is preferred that the reaction product contain not over 0.030 moles of bound alkali metal per mole of manganese. The rare earth content of the product on completion of the replacement reaction can contain from one mole of rare earth per 5 to 7 moles of manganese. However, a content of approximately one mole of rare earth per six moles of manganese is preferred. For example, on that basis, the empirical formula of the dehydrated product prepared from cerium ions is: $Ce_2O_3 \cdot 12MnO_2$. As produced and prior to drying, the rare earths are believed to be in hydroxide form, and the rare earth manganese oxide complex is also associated with water of hydration.

After the suspension has been formed at the pH of 5.0 to 7.0, as described above, and the replacement reaction is under way, it has been found that the pH of the suspension decreases as the reaction proceeds. Therefore, during the course of the reaction, it is not necessary to add additional acid to maintain the pH below 7.0. Further, as the reaction proceeds, the pH can be permitted to drop below 5.0. The final pH's on completion of the reaction of as low as 2.5 to 3.5 do not interfere with the desired completion of the reaction. In general, the pH of the suspension on completion of the reaction will approach the pH of the rare earth salts when dissolved in water (without manganese dioxide). Summarizing, after the initial adjustment of the pH of the suspension to 5.0 to 7.0, the reaction will proceed under acidic pH conditions, the pH gradually dropping during the reaction, and without the need for the addition of further pH adjusting agents.

On completion of the reaction, the particles of the reaction product are separated from the reaction solution. Next the recovered material is thoroughly washed with water to remove any free alkali metal. It is then ready for further processing. If the product is washed on the filter, the washed filter cake is ready for preparing the catalyst in pellet form.

The product is preferably prepared in the form of dried porous catalytic pellets. To accomplish this, the washed reaction product can be mixed with a suitable binder and pelletized. It has been found that binders which are capable of absorbing water are particularly desirable. For example, the binder may be water-containing bentonite. More specifically, the reaction product in hydrated form is mixed with water and bentonite to provide a paste which is extruded to form pellets. The paste may contain from 0.5 to 1.5 parts by weight of bentonite per part of manganese (Mn) in the reaction product. For example on an equal parts basis (1 pt. bentonite per part Mn), the paste will contain about 30% by weight of bentonite on a dry basis. In preparing the paste water is added to give a total water content of about 35–45% by weight. The paste is mixed and kneaded until it is homogenous. The pellets produced in this manner may be of any shape, but cylindrical pellets can be easily formed by extrusion and are advantageous. Such pellets may conveniently have a diameter of about 0.3 to 0.7 cm, and a length of 1.25 to 2.5 cm. From the cylindrical ribbons in which the paste is extruded, pellets can be formed of any desirable length.

The pellets are then dried to a porous nonagglomerating condition. The drying is preferably carried out in such a way as to avoid severe shrinkage or breakage of the pellets. For example, the extruded pellets are preferably dried slowly at a temperature of from 50° to 60° C. in a moving airstream of moderate flow rate from 8 to 10 hours. This gradual drying will cause the free water to slowly evolve, creating highly porous pellets without disrupting the pellet structure. After the intial drying, most of the water will have been removed. For example, if the extruded pellets contain 40% total water by weight, on completion of the intial drying, they may contain only about 10% water (as bound water). The final drying may be conveniently carried out at the time the catalyst is activated for use. This will further increase the porosity of the pellets. For example, the pellets may be heated at a temperature of 70° to 100° C. in a high velocity airstream for 5 to 10 minutes to remove the bound water. This will then complete the activation of the catalyst. The initial drying can be combined with the final drying and activation by heating the pellets in a moving airstream for 1 to 4 hours at a temperature of 150°–160° C. The procedure described will produce catalytic pellets of maximized, microscopic voids, which are desirable for optimizing catalytic activity.

The process of this invention is further illustrated by the following specific examples.

EXAMPLE I 47 to 83 g $Ce(NO_3)_3.6H_2O$ is added to 217 to 252 ml. water. When dissolved, 100 g by-product $MnO_2$ (47.46% $MnO_2$, 2.75% $K_2O$, 8.58% $Na_2O$, and 41.2% $H_2O$) is added to the solution in a manner that the pH will be maintained between 5 and 6. A pH up to 7.0 can be used, but cerium(III) hydroxide precipitates at pH 7.4, and such precipitation should be avoided. The pH is controlled with nitric acid additions as required. The temperature is maintained at 35° C., and the mixture is moderately agitated for 20 to 30 hours. Then, it is filtered and the solids are washed with water until all soluble substances are removed. There is obtained about 100 g of a semi-wet product having as a typical composition (expressed as oxides): 47.5% $MnO_2$, 15.0% $Ce_2O_3$, 0.35% $Na_2$, 0.5% $K_2O$, and 36 to 37% $H_2O$. The apparent formula of this composition is $Ce_2O_3.12MnO_2.XH_2O$. This product without further processing is ready for pelletizing.

EXAMPLE II 47 to 83 g $La(NO_3)_3.6H_2O$ is added to 217 to 253 ml water. When dissolved, 100 g of the by-product $MnO_2$ of Example I is added to the solution in a manner that the pH will not be lower than 6 nor higher than 7. The pH is controlled with nitric acid. The temperature is adjusted to 35° C. and the reaction mixture is moderately agitated for 20 to 30 hours. Then it is filtered and the solids are washed with water until all soluble substances are removed. There is obtained about 100 g of a semi-wet product having as typical composition (expressed as oxides): 14.9% $La_2O_3$, 46.5% $MnO_2$, 0.3% $K_2O$, 0.5% $Na_2O$, and 36 to 37% $H_2O$. The apparent formula of the compound is $La_2O_3.12MnO_2.XH_2O$. This product is ready for pelletizing as is.

EXAMPLE III 47 to 83 g of mixed ceria group rare earth nitrates (as the hydrates) are added to 217 to 253 ml. water. The rare earth (RE) ion mixture has the approximate composition (expressed as the oxides): 48% $CeO_2$, 20% $La_2O_3$, 18% $Nd_2O_3$, and 9 to 12% other rare earth metals of the ceria group. (Ce=cerium; La=lanthanum; and Nd=neodymium.) When dissolved, 100 g of the by-product $MnO_2$ of Example I is added to the solution in a manner that the pH will not be lower than 5 or higher than 6. The pH is controlled with nitric acid. The mixture is moderately agitated for 20 to 30 hours. Then it is filtered and the solids are washed with water until all soluble substances are removed. There is obtained about 100 g of a semi-wet product having as a typical composition (expressed as oxides): 47.5% $MnO_2$, 15.3% $RE_2O_x$, 0.5% $K_2O$, 0.1% $Na_2O$, and 36 to 37% $H_2O$. This product is ready for pelletizing.

The products of Examples I to III contain approximately 0.03 moles of total alkali per mole of Mn, and approximately one mole of rare earth metal per six moles of Mn.

EXAMPLE IV

The products produced by the foregoing Examples I, II and III can be pelletized as follows:

The reaction product is mixed with one pound bentonite per pound manganese. Water is added to provide a total content of 40%. The mixture is kneaded until a homogeneous paste is obtained. The paste is then extruded to form pellets.

The extruded pellets are dried at a temperature of from 50° to 60° C. in a moving airstream of moderate flow rate from 2 to 10 hours. The gradual drying will result in the removal of the free water. After the initial drying, most of the water will have been removed. For example, if the pellets as extruded contained 40% total water by weight, on completion of the initial drying they can still contain between 8 and 12% water, as bound water. The final drying may be conveniently carried out at the time the catalyst is activated for use. In this activation step, the catalyst is quickly heated above 100° C. in a high velocity airstream for 5 to 10 minutes to remove the bound water. Alternatively, the initial drying and the activation of the extruded pellets can be combined by removing both the free and bound water by heating between 150° and 160° C. for from 1 to 4 hours in a moving airstream. In this procedure, the extruded pellets are preferably loosely packed. It has been found that during the drying it is advantageous to have an airstream passing over the product (as opposed to stable air). Catalyst product dried in static air shows lower activity.

EXAMPLE V

As an alternative to the procedure of Example IV and based on present information, the best mode of pelletizing the rare earth-manganese oxidation catalysts is to utilize hydrated alumina [AlO(OH)] instead of bentonite. Any form of hydrated alumina suitable for use as a catalyst carrier can be employed, such as the commercial product, alpha alumina, which is the alpha form of hydrated alumina. More specifically, the catalytic pellets can be prepared from a paste comprising a mixture of the hydrated reaction product, such as the products produced by Examples I, II, and III, and partially peptized hydrated alumina. The paste mixture is dried to remove water.

Hydrated alumina is a known catalyst support material and is available commercially. For example, Catapal SB alpha alumina can be employed as supplied by Conoco Chemicals Division, Continental Oil Company, Houston, Tex. This hydrated alpha alumina product typically contains 74–75% by weight $Al_2O_3$, and has a boehmite crystal structure, which can be converted to gamma alumina by calcining for three hours at 900° F. Such alumina may be formed into pellets by various procedures involving partial peptization, wherein there is a partial reconversion of the solid alumina to a gel state. One procedure involves the addition of a peptizing acid, such as nitric acid, but other procedures can be used.

The hydrated alumina may be combined with the catalytic reaction product in amounts ranging from 0.25 to 2 parts of $Al_2O_3$ per part of manganese. For example, 1 part of Catapal SB alumina (74–75% $Al_2O_3$) per part of contained Mn is combined with the reaction product of Example I, II, or III. This corresponds approximately to a $Al_2O_3$ content of the mixture of 25–30% by weight on a dry basis. The water content of the resulting paste may range from about 35 to 45% by weight, the reaction product thereby being in hydrated form.

The paste prepared as described can be peptized by kneading or mulling for one to two hours. This results in partial peptization of the hydrated alumina, sufficient alumina gel being formed to act as a binder. Care should be taken not to overpeptize the material by excessive mulling times or by the addition of too much acid, if acid is employed to shorten the peptization time. For example, 12 to 13 grams of $HNO_3$ (100%) can be added per pound of Catapal SB, and the required partial peptization completed by mulling for five to fifteen minutes. Further details of the procedure are included in the following illustrative embodiment.

Damp catalytic reaction product (viz. from Examples I, II, or III) is mixed with one lb of Catapal SB per lb of contained manganese. Twelve grams of $HNO_3$ (100%) diluted with water is added per lb of the alumina. The total water added is such that the overall moisture content of the mixture amounts to 40–45%. After kneading for 5–15 minutes, the homogeneous paste is extruded to form pellets. The damp pellets are first dried for 10–20 hours at 100° C. in a low to moderate velocity airstream. This will remove most of the "free" water and leave about 8–12% as "bound" water. In the final preparation step, the catalyst is calcined for 3 hours at 480° C. in a dynamic airstream. The pelleted product is now essentially anhydrous and ready for use.

As compared with the pelleted product of Example IV, catalytic pellets prepared as described in this example provide certain advantages. Catalytic pellets are resistant to liquid water, and do not soften or disintegrate. Further, the crush strength is improved. Catalytic activity is also greater due to higher surface area and greater pour volume. The product has increased tolerance to high temperatures up to about 535° C. Also, it appears that the product is somewhat less susceptible to sulfur poisoning, and that the useable ratios of catalyst paste to binder permits the pelleted product to contain lower percentages of active material without loss of efficiency.

We claim:

1. The process of producing a rare earth-manganese oxidation catalyst by ion exchange reaction, comprising the steps of:
   (a) forming a suspension of finely-divided alkali metal delta manganese dioxide hydrate in an aqueous solution containing rare earth metal salt ions, said suspension having an initial pH of from 5.0 to 7.0, the rare earth metal ions being provided by one or more rare earths of the ceria subgroup;
   (b) exchanging the alkali of said alkali metal manganese dioxide hydrate with said rare earth metal ions at a temperature of at least 30° C. and under acidic pH conditions;
   (c) continuing said exchanging reaction until the manganese reaction product contains not over 0.05 moles of bound alkali metal per mole of manganese and at least one mole of total ceria subgroup rare earth metal per 5 to 7 moles of manganese;
   (d) separating said reaction product from said aqueous solution; and
   (e) preparing dried porous catalytic pellets from said reaction product.

2. The process of claim 1 in which said manganese dioxide is by-product manganese dioxide containing sodium and potassium.

3. The process of claim 1 or claim 2 in which said rare earth metal ions are cerium ions.

4. The process of claim 1 or claim 2 in which said rare earth metal ions are lanthanum ions.

5. The process of claim 1 or claim 2 in which said rare earth metal ions comprise a mixture of ceria subgroup ions including at least cerium, lanthanum, and neodymium ions.

6. The product produced by the process of claim 1 in which said amount of said ceria subgroup rare earth metal is chemically complexed to the manganese dioxide of said reaction product.

7. The process of claim 1 or claim 2 in which said reaction is carried out at a temperature of from 30° to 75° C. and at a pH of from 5.5 to 6.5.

8. The process of claim 1 or claim 2 in which said reaction is continued until said reaction product contains not over 0.03 moles of alkali metal per mole of manganese.

9. The process of claim 1 or claim 2 in which said reaction is continued until said reaction product contains approximately one mole of total ceria group rare earth metal per each six moles of manganese.

10. The process of claim 1 or claim 2 in which said ceria group rare earth metal ions are composed predominantly of cerium, lanthanum, and neodymium ions.

11. The process of claim 1 in which said catalytic pellets are prepared from a paste comprising a mixture of said reaction product in hydrated form and water-containing bentonite, said paste being extruded to form pellets, and said pellets being dried to a porous non-agglomerating condition.

12. The product produced by the process of claim 11 in which said amount of said ceria subgroup rare earth metal is chemically complexed to the manganese dioxide of said reaction product.

13. The process of claim 1 in which said catalytic pellets are prepared from a paste comprising a mixture of said reaction product in hydrated form and a partially peptized hydrated alumina catalyst carrier, said paste being dried to remove water.

14. The product produced by the process of claim 13 in which said amount of said ceria subgroup rare earth metal is chemically complexed to the manganese dioxide of said reaction product.

15. The process of producing a rare earth-manganese oxidation catalyst by ion exchange reaction, consisting essentially of the steps of:
   (a) introducing finely-divided alkali metal delta manganese dioxide hydrate into an aqueous solution of rare earth metal salt ions to form a reaction suspension, said suspension having a pH of from 5.5 to 6.5, the rare earth metal ions being provided by one or more rare earths of the ceria subgroup;
   (b) reacting said manganese dioxide in said suspension with said rare earth metal ions at a temperature of from 30° to 75° C. and at acid pH's of not over 6.5;

(c) continuing said reaction until the reaction product contains not over 0.03 moles of total bound potassium and sodium per mole of manganese and approximately one mole of total ceria group rare earth metal per each six moles of manganese;

(d) separating said reaction product from said aqueous solution; and (e) preparing dried porous catalytic pellets from said reaction product by forming a paste from a mixture of said reaction product in hydrate form and water-containing particulate bentonite, extruding said paste to form pellets, and drying said pellets to a porous non-agglomerating condition.

16. The product produced by the process of claim 15.

17. The process of producing a rare earth-manganese oxidation catalyst by ion exchange reaction, consisting essentially of the steps of:

(a) introducing finely-divided alkali metal delta manganese dioxide hydrate into an aqueous solution of rare earth metal salt ions to form a reaction suspension, said suspension having a pH of from 5.5 to 6.5, the rare earth metal ions being provided by one or more rare earths of the ceria subgroup;

(b) reacting said manganese dioxide in said suspension with said rare earth metal ions at a temperature of from 30° to 75° C. and at acid pH's of not over 6.5;

(c) continuing said reaction until the reaction product contains not over 0.03 moles of total bound potassium and sodium per mole of manganese and approximately one mole of total ceria group rare earth metal per each six moles of manganese;

(d) separating said reaction product from said aqueous solution; and (e) preparing dried porous catalytic pellets from said reaction product by forming a paste from a mixture of said reaction product in hydrate form and partially peptized particulate hydrated alumina, extruding said paste to form pellets, and drying said pellets to remove water.

18. The product produced by the process of claim 17.

19. The process of claim 17 in which said rare earth metal ions are cerium ions.

20. The product produced by the process of claim 19.

21. The process of claim 17 in which said rare earth metal ions are lanthanum ions.

22. The product produced by the process of claim 21.

23. The process of claim 17 in which said rare earth metal ions comprise a mixture of ceria group ions including at least cerium, lanthanum, and neodymium ions.

24. The product produced by the process of claim 23.

* * * * *